United States Patent [19]

Blunt

[11] 3,971,749

[45] July 27, 1976

[54] METHOD OF PREPARING SMALL PARTICLES OF POLYPROPYLENE

[75] Inventor: Harry W. Blunt, Hockessin, Del.

[73] Assignee: Hercules Incorporated, Wilmington, Del.

[22] Filed: July 7, 1975

[21] Appl. No.: 594,149

Related U.S. Application Data

[63] Continuation-in-part of Ser. No. 454,990, March 26, 1974, abandoned.

[52] U.S. Cl. ................. 260/33.4 PQ; 260/32.8 A; 260/33.2 R; 260/33.6 PQ; 260/33.8 UA; 260/34.2; 260/42.21; 260/42.54; 260/93.7; 260/94.9 GD; 526/351; 528/502; 528/503

[51] Int. Cl.² ..................... C08K 5/01; C08K 5/02; C08K 5/05

[58] Field of Search ........ 260/33.6 PQ, 34.2, 42.54, 260/94.9 GD, 33.4 PQ, 33.8 UA, 93.7

[56] References Cited

UNITED STATES PATENTS

| | | | |
|---|---|---|---|
| 2,870,113 | 1/1959 | Jones .......................... | 260/94.9 GD |
| 3,119,811 | 1/1964 | Haskell ....................... | 260/94.9 GD |
| 3,218,304 | 11/1965 | Rottig ......................... | 260/94.9 GD |
| 3,245,934 | 4/1966 | Krzyszkowski.............. | 260/94.9 GD |
| 3,257,351 | 6/1966 | Kraus et al.................... | 260/34.2 |
| 3,360,497 | 12/1967 | Jones ............................ | 260/34.2 |
| 3,475,369 | 10/1969 | Blunt ......................... | 260/33.6 PD |

*Primary Examiner*—James H. Derrington

[57] ABSTRACT

Substantially spherical particles of polypropylene are prepared by precipitating a solution of polymer under quiescent cooling conditions. Solvent can be from any class capable of dissolving polypropylene at elevated temperature, but must satisfy critical conditions relating to dipole moment, hydrogen bonding parameter, and solubility parameter.

5 Claims, No Drawings

METHOD OF PREPARING SMALL PARTICLES OF POLYPROPYLENE

This application is a continuation-in-part of my co-pending application Ser. No. 454,990, filed Mar. 26, 1974 and now abandoned.

This invention relates to the preparation of small, spherical particles of polypropylene. More particularly, it relates to a process for preparing such particles by a precipitation process.

Polypropylene is recovered from most conventional polymerization processes in the form of relatively large, irregularly shaped particles. The particles, known in the art as "flake", are suitable for use in molding and extrusion processes, as a rule. However, they are decidedly unsatisfactory in coatings applications where the large, irregular particle size, combined with the high melt viscosity of polypropylene, makes for great difficulty in applying smooth uniform coatings.

The most preferred coating techniques for use with polypropylene are electrostatic powder coating and fluid bed coating. The electrostatic method of application requires the use of relatively small particles which are preferably spherical in shape. Spherical particles of less than about 100 microns and preferably less than about 50 microns are preferred. Fluid bed coating requires spherical particles of less than 150 microns.

Particles of the type specified, however, have heretofore been difficult to obtain. The most successful means of preparing such particles has been via direct polymerization. However, direct polymerization techniques require rather drastic departures from conventional polymerization techniques, thus increasing the cost of the polymer excessively, and the particles are generally more irregular in shape. Moreover, these methods are by no means infallible and frequently do not yield the desired result. Grinding of flake polypropylene has also been tried but with very limited success both as to particle size and shape in addition to requiring great amounts of energy to achieve this limited success.

Methods for preparing small particles based on precipitation from solutions under the influence of high shear agitation have been used with fair success with other polymers. However, with polypropylene, this technique has resulted in formation of stringy, fibrous masses which wrap around the agitator shaft and become a completely useless mess.

It is the purpose of this invention to provide a method of preparing small, substantially spherical particles of polypropylene by precipitation from a solution, making use of precisely defined solution conditions and precipitation conditions. More specifically, it has been found that if polypropylene is dissolved at an elevated temperature to form a solution of about 10 to 25% by weight concentration in a solvent having a solubility parameter of about 6.6 to 10.3 (Cal/cc)$^{1/2}$, a dipole moment of about 0 to 1.7 Debye units, and a hydrogen bonding parameter of about 0 to 18.7 cm$^{-1}$ and is thereafter cooled quiescently to effect precipitation, and after cooling, is subjected to high shear conditions, the precipitated polymer will be in the form of discrete spherical particles about 1 to 100 microns in diameter.

It is well known that crystalline polypropylene is insoluble at room temperature in all known solvents. However, at elevated temperatures of about 120°C. and up, there are a number of materials in which it can be dissolved. These include paraffin hydrocarbons, aromatic hydrocarbons, halogenated hydrocarbons, aliphatic alcohols, tertiary amines, and even some esters, for example. The important criterion, however, which determines whether a material which is a solvent for polypropylene at any temperature will be operative in this invention is not the solvent class to which it belongs, but its adherence to the three criteria listed hereinabove.

The three characterizing parameters are known properties which are either published in the chemical literature or are experimentally determinable for any solvent. Solubility parameter is defined as the square root of the volume heat of vaporization expressed as (calories/cubic centimeter)$^{1/2}$. It is calculated as $$\sqrt{\frac{\text{molar heat of vaporization}}{\text{molar volume}}}$$

See J. Hildebrand et al, "Regular Solutions", Prentice-Hall Incorporated, 1962.

Hydrogen bonding parameter is defined as the relative proton attracting power of various solvents. It is obtained by measuring the shift in infra-red absorption of the R-O-D bond when deuterated methanol is added to the solvent in question versus the position of absorption of the R-O-D bond in benzene. The hydrogen bonding parameter is expressed as 10% of this difference, given in wave numbers (cm$^{-1}$). See Crowley et al, J. Paint Technology 38, No. 496, page 269, 1966.

Dipole moment is a well-known molecular property indicating the distribution of electrical charges in a neutral molecule.

As stated, values of the above parameters are published for many solvents. A compilation of all these parameters for a number of solvents can be found in Journal of Paint Technology 38, No. 496, page 269 (1966). Other tabulations can be found as follows:

Solubility Parameter
"Compatibility & Solubility" - Ibert Mellan, Ed. Noyes Development Corporation, Park Ridge, N.J. (1968)
H. Burrell, Official Digest of the Federation of Societies for Paint and Varnish Production - 27, No. 369, page 726 (1955)
H. Burrell, Official Digest of the Federation of Societies for Paint and Varnish Production - 29, No. 394, page 1159 (1957)

Dipole Moments
A. L. McLellan - Tables of Dipole Moments - W. H. Freeman & Co., San Francisco, Calif. (1963)
Handbook of Chemistry & Physics - Chem. Rubber Co., 48th ed. (1967–1968)

Hydrogen Bonding Parameter
W. J. Gordy - J. Chem. Physics 7, pgs. 93–99, Feb. 1939
W. J. Gordy et al - J. Chem. Physics 8, pgs. 170–177, Feb. 1940
W. J. Gordy et al - J. Chem. Physics 9, pgs. 204–214, Mar. 1941

The limits on the three characterizing parameters are quite critical. The value of all three parameters must fall within the above specified ranges in order for the solvent to perform satisfactorily, yielding the desired substantially spherical particles of small particle size. Materials which dissolve polypropylene but which do not meet the parameter limitations will either not form a particulate precipitate or the particles will not be spherical in shape.

A second critical limitation on the process is that the cooling must be done quiescently. That is to say, without stirring or otherwise subjecting the solution to any shear. If the solution is subjected to shear during cooling, the polymer forms a stringy, fibrous mass which is useless for the purposes contemplated for particles.

A third critical limitation on the process is that the concentration of the polypropylene must be at least about 10% by weight. Below this level, it has been found that the preparation of spherical particles of predominantly less than 100 microns is not assured. At concentrations below about 10% the polymer is likely to precipitate into large, irregularly shaped globules. Photomicrographs of polymer particles precipitated from less than 10% concentration clearly show, in many cases, the presence of such globules which cannot be broken down into spherical particles by the application of shear. Above 10% concentration such globules do not form if the polymer is cooled quiescently in proper solvent. The upper limit of concentration is dictated primarily by the dissolving power of the solvent employed. The normally preferred upper limit is about 25%.

As they are precipitated, the particles are in a highly flocculated or agglomerated state. In fact, at the concentration levels required to assure formation of particles as specified above, agglomeration is so great that the product has the physical attributes of a stiff gel which is wet to the touch and readily crumbled and broken. The agglomeration, however, is readily reversed by means of shear to liberate discrete, spherical polymer particles.

The shear required to liberate discrete particles can be effected via high speed agitation, e.g., a high shear blender. A homogenizer can also be employed such as the type in which the agglomerated polymer gel is pumped against a spring loaded check-type valve or through a screen. Any other type of high shear blending equipment can also be used.

Following the application of shear, the product is a thin, free-flowing liquid dispersion of the discrete, spherical polymers. The dispersion has a milky appearance. The particles come out of suspension readily but remain unagglomerated upon sitting and are easily resuspended by simple agitation, e.g., by shaking. If the application for which the particles are intended requires a more stable suspension, a suitable surfactant can be added to provide greater stability.

In addition to controlling the shape of the precipitate, the invention also affords a measure of control over the particle size, although the effects are not always precise. This is accomplished by means of solution concentration, polymer molecular weight and solution temperature. For any given solvent, there is a relationship among these variables. For example, for a specific solvent, if solution concentration and polymer molecular weight are held constant, the particle size will increase with solution temperature. For another solvent, the same relationship is observed, but at a different particle size level.

As molecular weight increases with other variables held constant, particle size generally increases. An increase in solution concentration causes a general trend toward a smaller particle size. Here again, the relationships among the variables are different with different solvents, but they are easily determined by experiment.

The invention is illustrated by the following examples; parts and percentages are by weight unless otherwise indicated.

EXAMPLE 1

Two parts of polypropylene (Intrinsic Viscosity 1.7) was charged to a capped, heavy walled glass vessel, and 18 parts of solvent was added to prepare a 10% solution. The vessels were capped and heated in a constant temperature bath with occasional shaking until a clear, homogeneous solution resulted. Clear solutions were attained with the solvents listed in Table I below. In these cases the samples were removed from the bath and allowed to cool to room temperature with no shaking or other agitation. When room temperature was reached, the gel-like product was transferred to an agitated vessel and agitated vigorously for several minutes. A turbid, milk-white suspension resulted. Polymer specimens from each vessel were examined microscopically. Results of this examination are recorded in Table I.

TABLE I

| Solvent | Sol. Parameter | Dipole Moment | H Bonding Parameter | Sol. Temperature | Particle Shape | Particle Size |
| --- | --- | --- | --- | --- | --- | --- |
| n-decane | 6.6 | 0 | 0 | 160°C. | Spherical | 60–70μ |
| n-octanol | 10.3 | 1.7 | 18.7 | 160°C. | Spherical | 10–15μ |
| n-hexanol | 10.7* | 1.7 | 18.7 | 160°C. | Agglomerated, fibrous | — |
| ethyl benzoate | 8.2 | 2.0* | 6.3 | 150°C. | Sheet-like mass | — |
| chlorobenzene | 9.5 | 1.6 | 1.5 | 140°C. | Spherical | 60–90μ |
| hexadecane | 8.0 | 0 | 0 | 150°C | Spherical | 12–40μ |
| cyclohexane | 8.2 | 0 | 0 | 130°C. | Spherical | 12–18μ |
| xylene (mixed) | 8.8 | 0.4 | 4.5 | 130°C. | Spherical | 30–70μ |
| n-heptane | 7.4 | 0 | 0 | 140°C. | Spherical | 30–50μ |
| tri-n-butyl amine | 8.7 | 0.7 | 21.8* | 160°C. | Peanut shaped | — |

*This parameter outside of operative range.

EXAMPLE 2

Following essentially the same procedure, except that the samples were continuously stirred while dissolving, 10% solutions of polypropylene having an intrinsic viscosity of 1.7 were prepared in three different solvents at a series of temperatures, cooled quiescently and sheared to show the effect of solution temperature on particle size. Results are recorded in Table II. All particles were essentially spherical by microscopic observation.

TABLE II

| Solvent | Solution Temperature | Particle Size |
| --- | --- | --- |
| Isopar H[1] | 133°C. | .3µ |
| " | 135°C. | 4–6µ |
| " | 138°C. | 8–10µ |
| " | 140°C. | 20–30µ |
| " | 143°C. | 40–50µ |
| Solvesso 150[2] | 130°C. | 10–12µ |
| " | 135°C. | 60–90µ |
| Xylene (mixed) | 125°C. | 35–40µ |
| " | 128°C. | 60–70µ |
| " | 137°C. | 75–90µ |

[1]Isopar H
mixture of isoparaffinic hydrocarbons — boiling range 180 to 190°C. Solubility parameter 7.1 — Dipole moment 0 — H Bonding parameter 0
[2]Solvesso 150
mixture of aromatic hydrocarbons — boiling range 190 to 210°C. Solubility parameter 8.5 — Dipole moment <1.5 — H Bonding parameter 2.7

EXAMPLE 3

In this example a series of 10% solutions of polypropylene of different molecular weight levels were prepared in Isopar H at 150°C., cooled quiescently and sheared as described in Example 1. Molecular weights of these specimens were determined by measuring intrinsic viscosity and using the correlation between molecular weight and intrinsic viscosity (J. Polymer Science 28, page 135 (1958)). Spherical particles resulted with particle size range increasing with increasing molecular weight as shown in Table III.

TABLE III

| I.V. | Polymer $M_w$ | Particle Size |
| --- | --- | --- |
| 1.3 | 156,000 | 12–30µ |
| 1.7 | 220,000 | 40–60µ |
| 2.25 | 325,000 | 50–80µ |

EXAMPLE 4

To demonstrate the effect of solution concentration on particle size, solutions of various polymers were prepared in Solvesso 150 at 130°C. and precipitated as described in Example 1. Table IV shows the particle size ranges which resulted. The general trend toward smaller particles with higher concentrations is apparent.

TABLE IV

| Polymer Concentration | I.V. = 1.38 | I.V. = 1.6 | I.V. = 2.2 |
| --- | --- | --- | --- |
| 7.5 | — | 10–70 | 20–100 |
| 10.0 | 10–40µ | 10–70 | 4–20 |
| 12.5 | 10–20µ | 6–20 | 2–20 |
| 25.0 | 2–20µ | 2–20 | 2–20 |

At concentrations below the 7.5% level shown above, the products contained some spherical particles, but in most cases, a relatively high percentage of the material was in the form of large, non-spherical globules.

If it is desired to recover the particles in discrete, dry powder form, it is preferred to filter them from the solvent and wash them well with a polar solvent such as an alcohol prior to drying. If the polar organic liquid wash is omitted, the particles may become tightly flocculated on drying and the flocculates are difficult to break down by mechanical means. They can, however, be redispersed in the original organic liquid relatively easily. Particles washed with the polar solvent are much less tightly flocculated and are easily broken down by mild mechanical means. Thus, if dry powder applications such as powder coatings are contemplated, the polar solvent wash is highly desirable. The preferred polar wash liquid is methanol when particles have been precipitated from an aromatic diluent. Isopropyl alcohol or ethanol are preferred with aliphatic diluents. In some cases, other polar solvents, such as ketones, ethers or other alcohols, can be used.

The method of the invention can also be employed to incorporate additives such as pigments, dyes, plasticizers or stabilizers, into the polymer particles. For example, colored particles are easily prepared by incorporating the desired dye or pigment into the solution prior to the precipitated step. A substantial portion of the dye or pigment becomes encapsulated by the precipitating polymer so that an intimate mixture thereof with polypropylene results. The advantages both in terms of the uniformity of the result and the economics of the process are clearly apparent.

With respect to the incorporation of additives into the particles, the method is highly advantageous for preparation of pigment concentrates for use in the coloring of extruded or molded objects. Pigment concentrations as high as 50%, based on polymer weight, can readily be incorporated using the method of the invention. These concentrates can then be dry blended with an appropriate amount of uncolored polypropylene and the pigment will be uniformly dispersed throughout the polypropylene mass during subsequent fabrication operations.

Incorporation of pigments into the small particles is illustrated by the following example.

EXAMPLE 5

A water-wet press cake of phthalocyanine blue pigment was dispersed using a polyvinylpyrrolidone copolymer dispersant in a mixture of Isopar H (see Example 2) with lower boiling isoparaffins. This mixture was azeotropically distilled while simultaneously sand milling. The pigment and organic phase were then separated by filtration, yielding a dispersion of pigment in Isopar H.

The pigment dispersion was heated and added to a 15% solution of polypropylene in Isopar H at 130°C. and mixed thoroughly while maintaining at 130°C. The resulting mixture was poured into 1 inch deep aluminum pans and allowed to cool to room temperature without further agitation. The pigment polymer particle slurry was filtered through a coarse sintered glass funnel. No evidence of free pigment could be seen in the filtrate.

The diluent-wet filter cake was pressed through a screening device having about 2 mm. diameter holes, then dried overnight at 105°C. in forced air steam oven.

Three such runs were carried out, preparing concentrates having 25, 40 and 50% pigment, respectively. Each of these was dry blended with conventional polypropylene flake of about 2.2 intrinsic viscosity and let down to a concentration of about 0.5%. Uniformity of pigment dispersion and physical properties of filaments spun from these compositions were commercially satisfactory.

Pigments of other colors can also be incorporated into polypropylene in this way.

What I claim and desire to protect by Letters Patent is:

1. A method of preparing a dispersion of polypropylene in the form of discrete substantially spherical particles of about 1 to 100 microns in diameter which comprises preparing a homogeneous solution of about 10 to 25% concentration by weight of polypropylene at an elevated temperature in a normally liquid organic material which is a solvent for polypropylene at a temperature of at least 120°C. and which has a solubility parameter of about 6.6 to 10.3 (Cal/cc)$^{1/2}$, a dipole moment of about 0 to 1.7 Debye units and a hydrogen bonding parameter of about 0 to 18.7 cm.$^{-1}$, thereafter cooling said solution to room temperature under quiescent conditions to precipitate the polypropylene, subjecting the precipitated polymer to high shear conditions and recovering a dispersion of particles in the organic liquid.

2. The method of claim 1 where the normally liquid organic material is selected from the class consisting of paraffin hydrocarbons, aromatic hydrocarbons, halogenated hydrocarbons, cycloaliphatic hydrocarbons, and aliphatic alcohols.

3. The method of claim 2 including the additional step of incorporating a coloring material into the polymer solution in an amount up to about 50% by weight of the polymer prior to quiescently cooling the solution.

4. A method of preparing discrete, substantially spherical particles of polypropylene about 1 to 100 microns in diameter which method comprises preparing a dispersion of polypropylene according to the method of claim 1 and thereafter removing the resultant particles from the liquid organic material, washing with a polar organic liquid and drying.

5. The method of claim 4 including the additional step of incorporating a coloring material into the polymer solution in an amount up to about 50% by weight of the polymer prior to quiescently cooling the solution.

* * * * *